United States Patent [19]

Becker

[11] 4,163,233
[45] Jul. 31, 1979

[54] CONTINUOUS-WAVE RANGE MEASUREMENT APPARATUS
[75] Inventor: Harold D. Becker, Buffalo, N.Y.
[73] Assignee: Calspan Corporation, Buffalo, N.Y.
[21] Appl. No.: 849,370
[22] Filed: Nov. 7, 1977
[51] Int. Cl.² .......................... G01S 9/37; G01S 9/56
[52] U.S. Cl. ................................ 343/12 R; 343/6.5 R
[58] Field of Search ......................... 343/12 R, 6.5 R
[56] References Cited
U.S. PATENT DOCUMENTS

| | | | |
|---|---|---|---|
| 3,769,589 | 10/1973 | Buntschuh et al. | 343/12 R |
| 3,790,940 | 2/1974 | Becker | 343/12 R |

Primary Examiner—Maynard R. Wilbur
Assistant Examiner—Lawrence Goodwin
Attorney, Agent, or Firm—Allen J. Jaffe; David J. Zobkiw

[57] ABSTRACT

Distance is measured with a tone modulated AM radio system by making a signal at the ranging tone frequency phase coherent with respect to the modulation on the RF signal at the input to the receiver by means of a product detector located ahead of the receiver of the transponder. In this way, a ranging tone phase is established which is a direct and accurate measure of the modulation phase (delayed by the propagation time) and is independent of any modulation phase shifts experienced in the receiver.

2 Claims, 3 Drawing Figures

CONTINUOUS-WAVE RANGE MEASUREMENT APPARATUS

The present invention is an improvement over U.S. Pat. No. 3,790,940. That device was based upon the fact that the energy of the carrier frequency component at the output of the product detector is reduced to zero when the modulation signal input to the product detector is phase coherent with the modulation on the received RF signal. The magnitude of the signal at the carrier frequency is obtained by passing the output of the product detector, y(t), through a narrow-band filter centered at the carrier frequency and rectifying the output in an envelope detector. Thus, the earlier device only made use of the fact that the magnitude of the carrier term became zero when the phase, $\alpha$, of the ranging tone input to the product detector was made equal to the modulation phase delay, $\theta$. The information contained in the phase of the carrier term was destroyed by the envelope detector at the output of the narrow-band filter.

It is an object of this invention to provide improved apparatus for implementing a range tracking servo.

It is a further object of this invention to provide apparatus which doubles the non-ambiguous range capability for a given modulation frequency.

It is an additional object of this invention to provide continuous-wave ranging apparatus that provides the sense information to drive the range tracking servo without the necessity of an auxiliary dither system.

Basically, the present invention is directed to an improved CW ranging apparatus which has the advantage of providing the sense information to drive the range tracking servo without the necessity of an auxiliary dither system while doubling the non-ambiguous range over which the system can operate for a prescribed modulation frequency. To achieve these advantages, the receiver is required to have modest phase stability characteristics and also to have a bandwidth capable of receiving both the carrier and first order side-band terms of the product detector output.

BRIEF DESCRIPTION OF THE DRAWINGS

For a fuller understanding of the present invention, reference should now be had to the following detailed description thereof taken in conjunction with the accompanying drawings wherein.

DESCRIPTION OF THE PREFERRED EMBODIMENT

Figure 1:
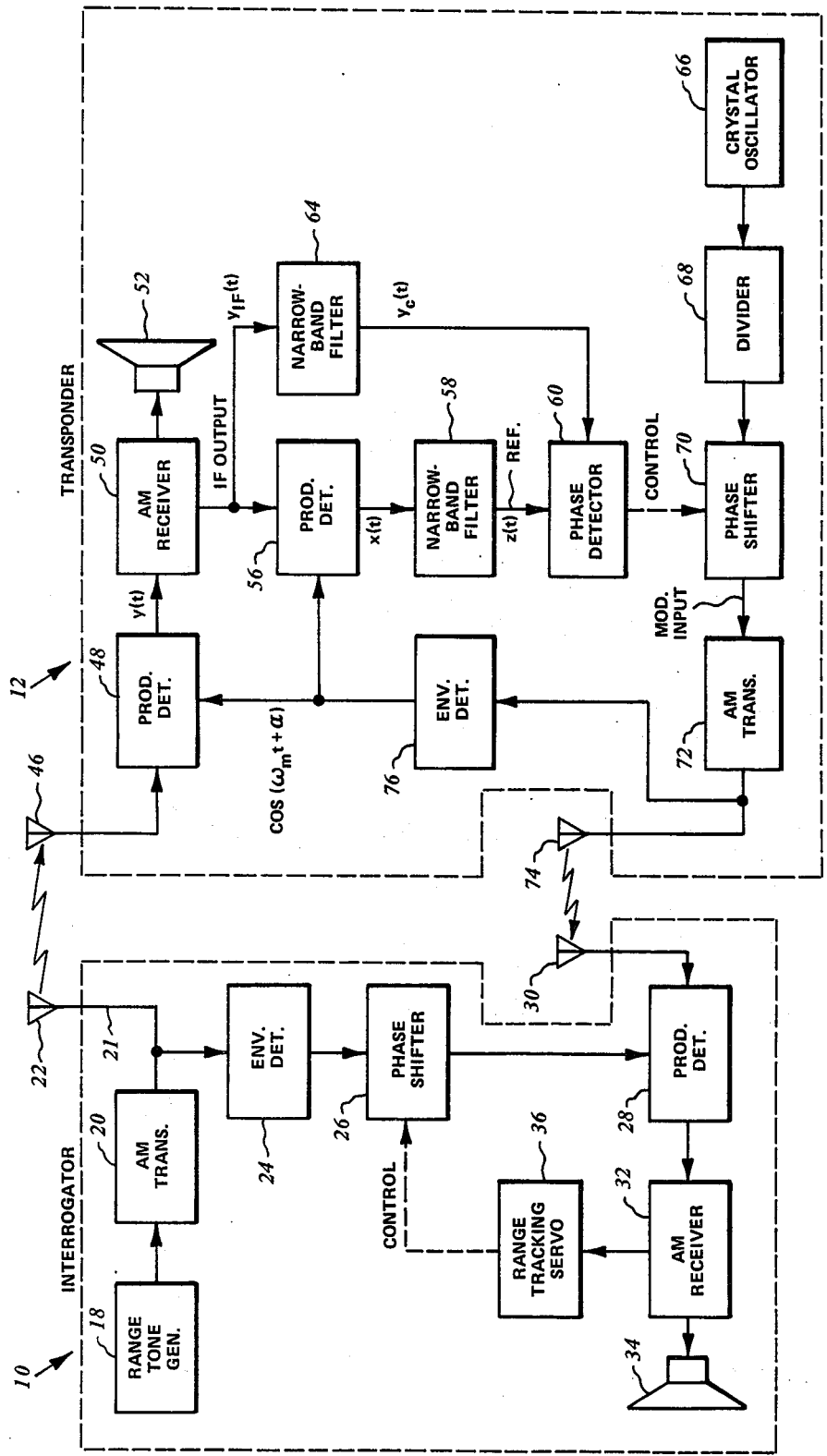
FIG. 1 is a block diagram of the system.

FIG. 1 illustrates an offset frequency system in which the transmitter and receiver of both interrogator 10 and transponder 12 are operated simultaneously on different carrier frequencies. The AM transmitter 20 of interrogator 10 is connected to range tone generator 18 which may take the form of a crystal oscillator. Antenna 22 is coupled to transmitter 20 via line 21 and radiates the signal toward the receiving antenna 46 of transponder 12.

The transponder 12 includes a conventional AM receiver 50 and has a product detector or multiplier 48 located intermediate receiving antenna 46 and receiver 50. In normal operation receiver 50 drives a suitable sound reproducer 52 or the like. The IF output, $y_{IF}(t)$, of receiver 50 is supplied to narrow-band filter 64 and as a first input to product detector 56. The output of product detector 56 is supplied to narrow-band filter 58 which supplies a first input to phase detector 60. The narrow-band filter 64 supplies a second input to phase detector 60 which supplies a control signal for controlling or driving phase shifter 70.

A suitable second ranging tone signal source at the modulating frequency of the received signal is fed by crystal oscillator 66, or the like, via divider 68 into phase shifter 70. Phase shifter 70 supplies a modulating input signal to AM transmitter 72 which transmits a signal via antenna 74 to the receiving antenna 30 of interrogator 10. The output of transmitter 72 is also fed into envelope detector 76, the output of which is fed as a second input to product detectors 48 and 56.

At the interrogator 10, the received signal from antenna 30 is fed as a first input to product detector 28, the output from which is fed into an AM receiver 32 which is similar to the receiver 50 of transponder 12. The IF output of receiver 32 is supplied to range tracking servo 36. The output of receiver 32 is fed to a suitable sound reproducer 34. Range tracking servo 36 controls the actuation of phase shifter 26 which controls the phase of the range tone signal obtained from transmitter 20 through envelope detector 24. The output of the phase shifter 26 is fed as a second input to product detector 28.

OPERATION

Referring to FIG. 1, assume that it is desired to make a measurement, at the interrogator 10, of the range between the interrogator 10 and the transponder 12. The AM transmitter 20 is amplitude modulated by a sinusoidal ranging tone at a frequency of $\omega_m$ radians per second by range tone generator 18. The radiated signal, $e_t$, may be expressed as:

$$e_t = E_c(1 + m \sin \omega_m t) \cos \omega_c t \tag{1}$$

where
$E_c$ is the carrier amplitude
$\omega_c$ is the carrier frequency in radians per second
$\omega_m$ is the modulation frequency in radians per second
and
m is the modulation factor.

The phase reference of the modulation on the transmitted signal is extracted by means of a wide-band envelope detector 24 which is connected directly to the antenna feed line 21 rather than taking the modulation signal supplied at the input to the transmitter 20 by range tone generator 18. In this way, variations in the phase shift through the range tone generator 18 and transmitter 20 are also eliminated as sources of error in the range calibration or measurement.

The transmitted signal is delayed by $T = R/C$ seconds in propagating over a distance, R, between transmitter 20 and the receiver 50 of transponder 12, where C is the speed of light. That is, the RF carrier experiences a phase shift of $\phi = \omega_c T$ radians while the modulation phase is delayed by $\theta = \omega_m T$ radians. The received signal, $e_r$, may be expressed as:

$$e_r = k\, E_c[1 + m \sin(\omega_m t + \theta)] \cos(\omega_c t + \phi) \tag{2}$$

where
k is the propagation attenuation factor $\theta$ is the phase shift of the modulation due to the propagation delay, in radians and $\phi$ is the phase shift of the RF carrier due to the propagation delay, in radians.

This received signal is applied as one input to product detector 48. The other input to product detector 48 is a sinusoidal signal at the frequency of the ranging tone which may be derived from the audio output of the receiver 50 or from crystal oscillator 66 and fed via divider 68, phase shifter 70, transmitter 72 and envelope detector 76 to product detectors 48 and 56. Assuming the phase of the ranging tone input to the product detector 48 is $\alpha$, then the output of the product detector 48, y(t), may be expressed as $$y(t) = k\, E_c[1 + m\, \sin\,(\omega_m t + \theta)]\, \cos\,(\omega_c t + \phi)\, \cos\,(\omega_m t + \alpha) \qquad (3)$$

$$= kE_c[\cos\,(\omega_m t + \alpha) + m/2\, \sin\,(2\omega_m t + \theta + \alpha) + m/2\, \sin\,(\theta - \alpha)]\, \cos\,(\omega_c t + \phi) \qquad (4)$$

$$y(t) = k/2 E_c\{\cos\,[(\omega_c + \omega_m)t + \alpha + \theta] + \cos\,[(\omega_c - \omega_m)t + \phi - \alpha] + m/2\, \sin\,[(\omega_c + 2\omega_m)t + \phi + \theta + \alpha] - m/2\, \sin\,[(\omega_c - 2\omega_m)t + \phi - \theta - \alpha] + m/2\, \sin\,(\theta - \alpha)\, \cos\,(\omega_c t + \phi)\} \qquad (5)$$

Thus, the spectrum at the output of the product detector 48 is composed of two side-frequency components at $\omega_c \pm \omega_m$, a second pair at $\omega_c \pm 2\omega_m$ and a carrier frequency term, $m/2\, \sin\,(\theta - \alpha)\, \cos\,(\omega_c t + \phi)$ the last term in Equation 5.

The product detector 48 may be thought of as a device which performs a frequency translation. The RF input to the product detector 48 consists of a carrier which is amplitude modulated by a sinusoidal ranging tone. The frequency spectrum at this input to the product detector 48 therefore consists of one spectral line at the carrier frequency, $\omega_c$, and two components at $\pm\omega_m$ from the carrier. The second input is a tone, $\cos\,(\omega_m t + \alpha)$, at $\omega_m$ radians per second. The operation of the product detector 48 creates an output which is represented by the translation (or shift) in frequency of each of the RF input components by an amount plus and minus $\omega_m$. That is, the energy of the received carrier (at the frequency, $\omega_c$) is translated to two new components at $\omega_c \pm \omega_m$. Each of the original side-bands (which were at $\omega_c \pm \omega_m$) are now translated to $(\omega_c \pm \omega_m) \pm \omega_m$ and result in energy at $\omega_c$ and at $\omega_c \pm 2\omega_m$. Thus, the energy which exists at the frequency, $\omega_c$, at the output of product detector 48 is derived from the product of the original side-band components and the sinusoidal range tone (at a frequency, $\omega_m$). Referring to Equation 5, note that when $\alpha$ equals $\theta$, the carrier term is reduced to zero. In the operation of the system, phase shifter 70 is adjusted to provide a properly phased range tone input to the product detector 48 and thereby produce a null in the energy at the carrier frequency. As a result, the ranging tone at the input to the product detector 48 is made coherent (actually in phase quadrature in the AM system) with the range delayed modulation signal on the received carrier and is thus a measure of the range between the transmitter 20 and the receiver 50. It is also observed from Equation 5 that the sign of the carrier term reverses when $\alpha$ is equal to $\theta$.

The device of U.S. Pat. No. 3,790,940 was based upon the fact that the energy of the carrier frequency component at the output of the product detector is reduced to zero when the modulation signal input to the product detector is phase coherent with the modulation on the received RF signal. The magnitude of the signal at the carrier frequency is obtained by passing y(t) through a narrow-band filter centered at the carrier frequency and rectifying the output in an envelope detector. Thus, the earlier device only made use of the fact that the magnitude of the carrier term became zero when $\alpha$ was made equal to $\theta$. The information contained in the phase of the carrier term was destroyed by the envelope detector at the output of the narrow-band filter.

In the device of FIG. 1, however, the phase of the carrier frequency signal at the output of the narrow-band filter 64 is employed to provide a "sense" signal to establish the direction in which $\alpha$ must be changed to achieve a stable closed loop system which maintains $\alpha$ equal to $\theta$ as the range changes. The output of product detector 48 consists of a carrier frequency component and two sets of side-bands as given by Equation 5. These components appear, centered at the intermediate frequency, at the IF output, $y_{IF}(t)$, of the receiver 50. The term, $y_c(t)$, representing the carrier frequency component (at the IF) is extracted by means of narrow-band filter 64 which yields $$y_c(t) = m/2\, \sin\,(\theta - \alpha)\, \cos\,(\omega_{IF} t + \phi)$$

Instead of using an envelope detector and observing a carrier amplitude null, a carrier phase reference is established in order to extract the phase information from the carrier term. Note that the signal $y_{IF}(t)$ contains a sideband pair at $\omega_{IF} \pm \omega_m$ which were created by the frequency translation which occurred in product detector 48 as described above. A second product detector 56 with the same low frequency input that was applied to product detector 48 is employed to translate the sideband energy in the signal $y_{IF}(t)$ back to the carrier (IF) frequency. The output, x(t), of the second product detector may be written $$x(t) = y_{IF}(t)\, \cos\,(\omega_m t + \alpha) = kE_c[\cos\,(\omega_m t + \alpha) + m/2\, \sin\,(2\omega_m t + \theta + \alpha) + m/2\, \sin\,(\theta - \alpha)]\, \cos\,(\omega_{IF} t + \phi)\, \cos\,(\omega_m t + \alpha)$$

The signal, x(t), is passed through narrow-band filter 58 which eliminates all terms but the term, z(t), at the IF carrier frequency. Thus, $$z(t) = k/2 E_c\, \cos\,(\omega_{IF} t + \phi)$$

Narrow-band filter 58 is identical to the narrow-band filter 64 employed to obtain the signal, $y_c(t)$, which is also a signal at the IF carrier frequency and which contains the range information in terms of the phase angle $\theta$. Assuming that no phase shift of the IF carrier signals is introduced by either of the narrow-band filters 58 and 64, a phase reference, z(t), has been established against which the phase of the signal $y_c(t)$ may be compared in phase detector 60. The polarity of the output signal from phase detector 60 will then be used to drive phase shifter 70 to produce a phase shift, $\alpha$, in the proper direction to maintain a carrier null. Hence, the low-frequency signal input to product detector 48 and, therefore, the envelope of the transmitter output will be phase coherent with the modulation on the received signal and be a measure of the range induced phase shift of the modulation. The AM signal is then transmitted back to the interrogator 10 where a similar configuration measures the two-way modulation phase shift.

Note that with this arrangement, the effects of an unknown or variable phase shift of the modulation introduced by AM transmitter 72 will be completely eliminated because the system will continuously correct $\alpha$ in order to provide the correctly phased low-frequency input to product detector 48.

The signal $y_{IF}(t)$ at the IF output of receiver 50 will be delayed (i.e., each term will experience a phase shift) as a consequence of the bandpass characteristics of the RF and IF circuits. However, the only effect of the uncompensated phase shifts in this section of the transponder 12 will be to attenuate the magnitude of the carrier reference signal applied to the phase detector 60. The amplitude of the reference signal will diminish as the cosine of the phase shift at the modulation frequency. Although the phase shift through the RF and IF circuits will not remain constant, the variation can be expected to remain under 20 to 30 degrees and be of no serious consequence.

Figure 2A:
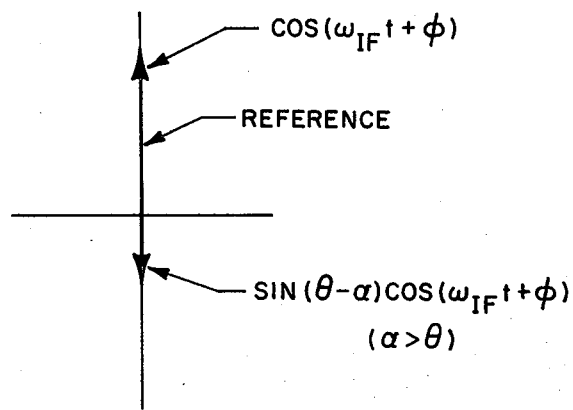
FIG. 2a is a phasor diagram of the phase detector operation for the case of no relative phase error.
Figure 2B:
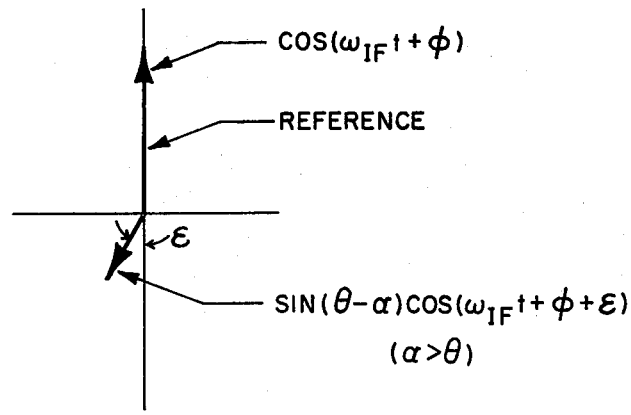
FIG. 2b is a phasor diagram of the phase detector operation for the case of a relative phase error, $\epsilon$.

In the device of U.S. Pat. No. 3,790,940 which simply observes the magnitude of the carrier term at the output of an envelope detector, the carrier phase shift due to the narrow-band filter which selects the carrier term from the side-band components of the IF output signal is of no concern. However, in the present device, two narrow-band filters, 58 and 64 respectively, are required and a relative phase shift of the carrier frequency terms introduced by these filters can degrade the performance of the range tracking loop. The output of narrow-band filter 58 is used as the carrier phase reference input to phase detector 60. Narrow-band filter 64 is used to obtain the carrier frequency term, $y_c(t)$, which is compared to the reference signal in phase detector 60. The operation of the phase detector 60 is shown in FIG. 2a, for the case where no relative phase error exists between the two inputs to the phase detector 60. The output of phase detector 60 will be either positive or negative depending on the value of $(\theta - \alpha)$. In the event that narrow-band filters 58 and 64 introduce a relative phase error, $\epsilon$, between the two phase detector inputs, the condition in FIG. 2b is obtained. Again, the polarity of the output of the phase detector 60 will be determined by the sign of the $\sin(\theta - \alpha)$ term and will give the proper sense information provided that $\epsilon$ is less than 90°. That is, the polarity of the phase detector output will indicate whether the vertical projection of the $\sin(\theta - \alpha) \cos(\omega_{IF} t + \phi + \epsilon)$ term is in the upper or lower half plane of FIG. 2b. The sensitivity of the phase detector 60 will be reduced by $\cos \epsilon$; however, $\epsilon$ can be maintained within a reasonable value and the degradation in system performance due to the relative phase shift of narrow-band filters 58 and 64 will be negligible.

The signal at the ranging tone frequency may be obtained in the transponder 12 from independent crystal oscillator 66. The frequency stability of the crystal oscillator 66 must be sufficient to allow the automatic null seeking circuitry to maintain the phase of the range tone input to the product detector 48 at the value which produces a null in the energy at the carrier frequency. This stability can be achieved with a small, inexpensive crystal oscillator 66 without the need for oven-stabilized temperature control. A signal at the range tone frequency may be obtained in the transponder 12 from the audio output supplied to sound reproducer 52 by receiver 50. It is also possible to replace crystal oscillator 66, divider 68, and phase shifter-elements 70 with a voltage controlled crystal oscillator driven directly from the output of phase detector 60.

A similar receiving configuration at the interrogator 10 produces a signal at the ranging tone frequency which is then a measure of the two-way phase delay of the modulation. Specifically, AM transmitter 72 of transponder 12 transmits a second ranging tone at the modulation frequency $\omega_m$, which is received by antenna 30 and is fed as a first input to product detector 28. The output of product detector 28 is supplied to AM receiver 32. The IF output of receiver 32 is supplied to range tracking servo 36. Range tracking servo 36 controls the actuation of phase shifter 26 which controls the phase of the range tone signal obtained from transmitter 20 through envelope detector 24. The output of the phase shifter 26 is fed as a second input to product detector 28. The phase shifter 26 is adjusted to provide a properly phased range tone input to product detector 28 and thereby produce a null in the energy at the carrier frequency. As a result, the ranging tone at the input to product detector 28 is made coherent (in phase quadrature) with the range delayed modulation signal on the received carrier and is thus a measure of the two-way range between interrogator 10 and transponder 12.

The phase of the returned modulation may be compared with the reference signal in a phase detector to determine the range between the two transmitter-receiver terminals. As illustrated, the range is obtained directly from the position of phase shifter 26 which is a measure of the phase shift between the received envelope and the phase reference.

Although the invention has been described in terms of an AM offset frequency system in which the transmitter and receiver at each terminal are operated simultaneously on different carrier frequencies, this technique can also be adapted to single channel transceiver type operation in which each terminal must transmit and receive sequentially in time. Also, the range measurement was described as being made at the interrogator, however, either terminal may be so designed as to function as the interrogator. This basic technique may be added to FM radio communication systems in which the modulation index would be established to provide for sufficiently large carrier and first order side-band components. Such an FM system would operate with a low modulation index which is compatible with current FM bandwidth assignments.

Although a preferred embodiment of the present invention has been illustrated and described, other changes will occur to those skilled in the art. It is therefore intended that the scope of the present invention is to be limited only by the scope of the appended claims.

I claim:

1. Communication and ranging apparatus including:
   interrogator means for transmitting a first ranging tone at a first carrier frequency and for receiving a second ranging tone; and
   transponder means for receiving said first ranging tone and for transmitting said second ranging tone at second carrier frequency and including:
   (a) a receiving antenna;
   (b) receiver means producing an IF output;
   (c) first product detector means having a first input connected to said receiving antenna and an output connected to said receiver means;
   (d) first narrow-band filter means for extracting a component of said first carrier frequency from said IF output;
   (e) second product detector means having a first input connected to said IF output and translating sideband energy in said IF output back to said first carrier frequency;

(f) second narrow-band filter means operatively connected to said second product detector means for producing a first carrier frequency carrier phase reference output;

(g) phase detector means operatively connected to said first and second narrow-band filter means and producing a control signal in response to said component of said first carrier frequency and said first carrier frequency carrier phase reference output;

(h) a ranging tone signal source for producing said second ranging tone;

(i) transmitter means for transmitting said second ranging tone at said second carrier frequency;

(j) phase shifter means for modulating said signal at said second ranging tone and communicating said modulated signal to said transmitter means in response to said control signal; and (k) means for supplying a sinusoidal signal derived from said second ranging tone at said second carrier frequency as a second input to said first and second product detector means whereby said first ranging tone at said first carrier frequency received at said receiving antenna is made phase coherent with respect to modulation on said first ranging tone and said first carrier frequency component is reduced to zero in said first product detector means.

2. The communication and ranging apparatus of claim 1 wherein said interrogator means includes:

(a) means for transmitting said first ranging tone at said first carrier frequency;

(b) means for receiving said second ranging tone; and (c) means for making said second ranging tone phase coherent with the range delayed modulation on said second carrier frequency and thereby giving a measure of the range between said interrogator means and said transponder means.

* * * * *